United States Patent
Ueno

(10) Patent No.: US 9,542,602 B2
(45) Date of Patent: Jan. 10, 2017

(54) DISPLAY CONTROL DEVICE AND METHOD

(71) Applicant: FUJITSU LIMITED, Kawasaki-shi, Kanagawa (JP)

(72) Inventor: Ayumi Ueno, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 36 days.

(21) Appl. No.: 14/598,987

(22) Filed: Jan. 16, 2015

(65) Prior Publication Data

US 2015/0206010 A1  Jul. 23, 2015

(30) Foreign Application Priority Data

Jan. 21, 2014 (JP) .................. 2014-008744

(51) Int. Cl.
*G06K 9/00* (2006.01)
*G06T 11/00* (2006.01)

(52) U.S. Cl.
CPC ....... *G06K 9/00671* (2013.01); *G06K 9/00255* (2013.01); *G06T 11/00* (2013.01); *G06K 2009/00328* (2013.01)

(58) Field of Classification Search
CPC ................ G06T 7/0012; G06T 2207/30004; G06K 9/00671; G01B 21/04
USPC ...................................... 345/633
See application file for complete search history.

(56) References Cited

U.S. PATENT DOCUMENTS

| 2007/0177780 A1* | 8/2007 | Chui ............... G06F 19/321 382/128 |
| 2013/0301925 A1* | 11/2013 | Nashida ............ G06T 11/60 382/195 |
| 2013/0329970 A1* | 12/2013 | Irie ............... G06K 9/00288 382/118 |
| 2015/0078667 A1* | 3/2015 | Yun ................ G06K 9/6201 382/195 |

FOREIGN PATENT DOCUMENTS

| JP | 2005-092700 A | 4/2005 |
| JP | 2012-239004 A | 12/2012 |

* cited by examiner

*Primary Examiner* — Gregory J Tryder
*Assistant Examiner* — Yuehan Wang
(74) *Attorney, Agent, or Firm* — Oblon, McClelland, Maier & Neustadt, L.L.P.

(57) ABSTRACT

A display control device includes circuitry configured to detect a specific object that is supported by an authentication target in an image, obtain content data associated with the specific object, the content data including a registered image of a registered user and positional information between the specific object and the registered image, and control a display to superimpose the registered image on the image at a position based on the positional information in order to provide a comparison between the authentication target and the registered user.

18 Claims, 15 Drawing Sheets

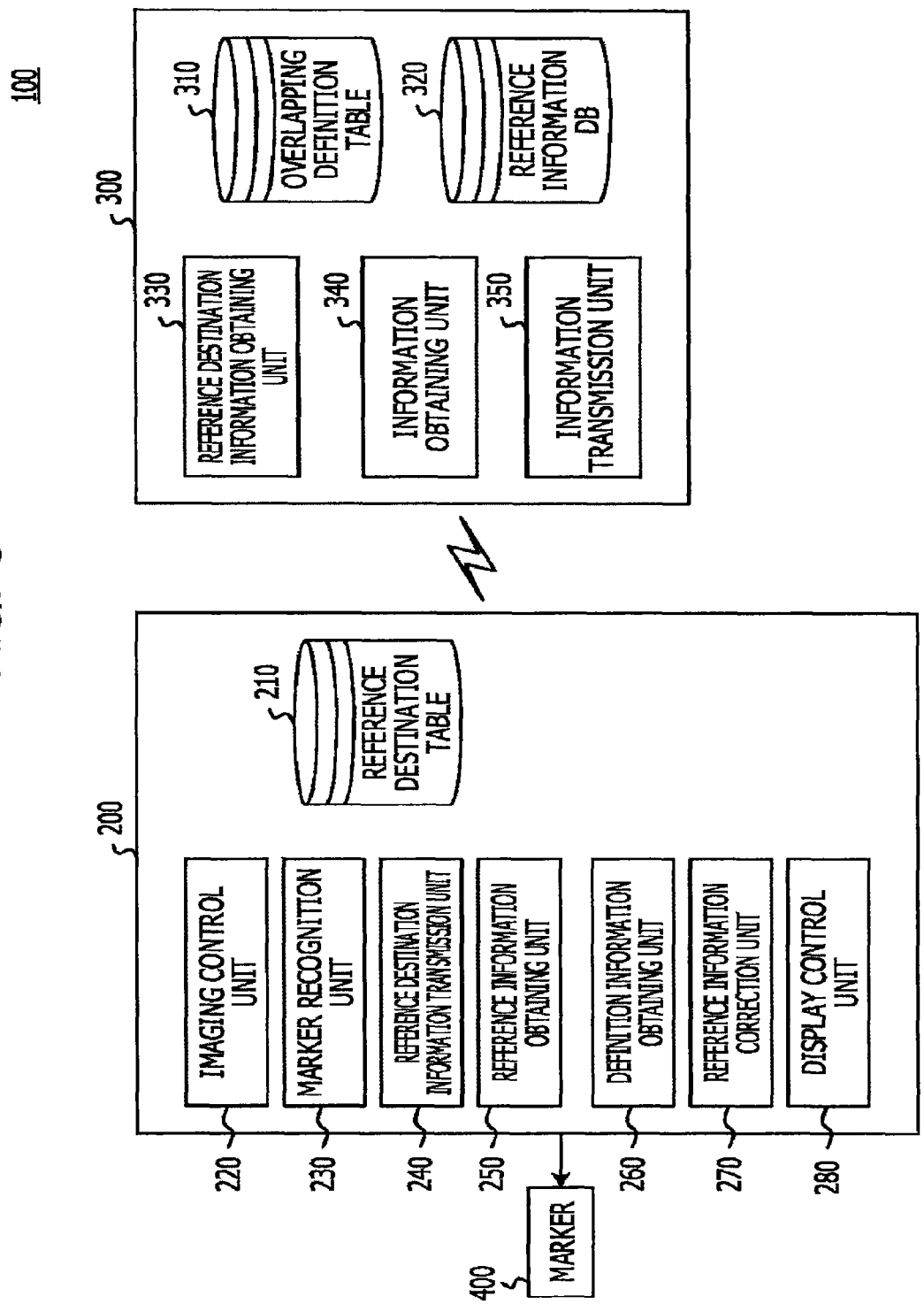

FIG. 4A

| MARKER ID | EMPLOYEE NUMBER |
|---|---|
| 1 | 012345 |
| 2 | 012346 |
| ⋮ | ⋮ |
| 10 | 012345 |
| ⋮ | ⋮ |

| EMPLOYEE NUMBER | REFERENCE ID |
|---|---|
| 012345 | 01 |
| 012346 | 02 |
| ⋮ | ⋮ |

| REFERENCE ID | POSITION INFORMATION [X,Y,Z] | DISPLAY SIZE [X,Y,Z] | ROTATION ANGLE [X,Y,Z] | FILE NAME |
|---|---|---|---|---|
| 01 | 1,0,0 | 1,1,1 | 0,0,0 | 1 jpg |
| 01 | 5,1,0 | 1,1,1 | 0,0,0 | PERSONNEL INFORMATION |
| 02 | 1,0,0 | 1,1,1 | 0,0,0 | 2 jpg |
| 02 | 5,1,0 | 1,1,1 | 0,0,0 | PERSONNEL INFORMATION |
| ⋮ | ⋮ | ⋮ | ⋮ | ⋮ |

FIG. 6

| REFERENCE ID | FACE PICTURE | PICTURE OF WHOLE BODY | PERSONNEL INFORMATION |
|---|---|---|---|
| 01 | 1.jpg | 11.jpg | text1.doc |
| 02 | 2.jpg | 22.jpg | text2.doc |
| ⋮ | ⋮ | ⋮ | ⋮ |

320

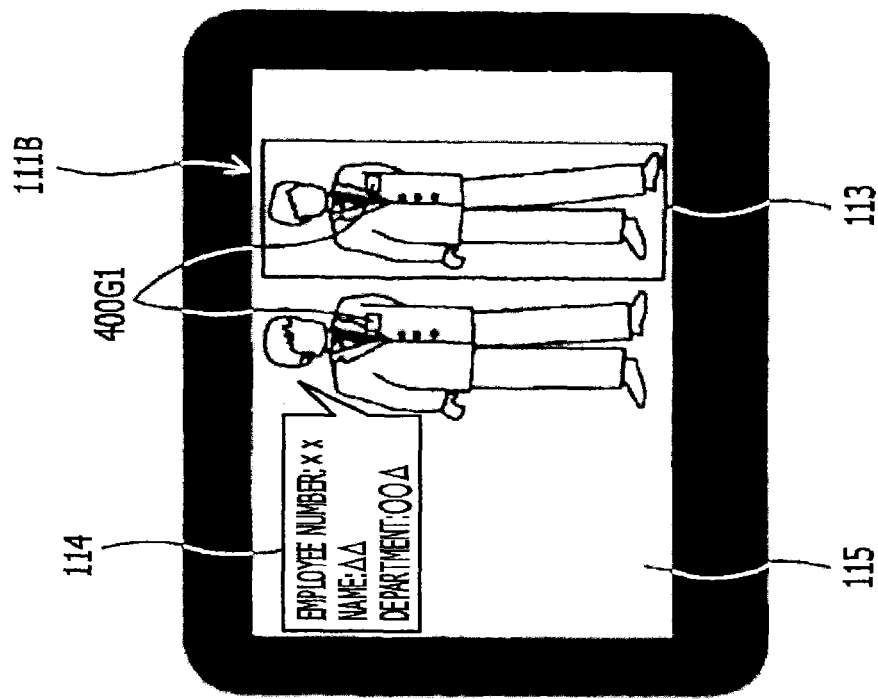
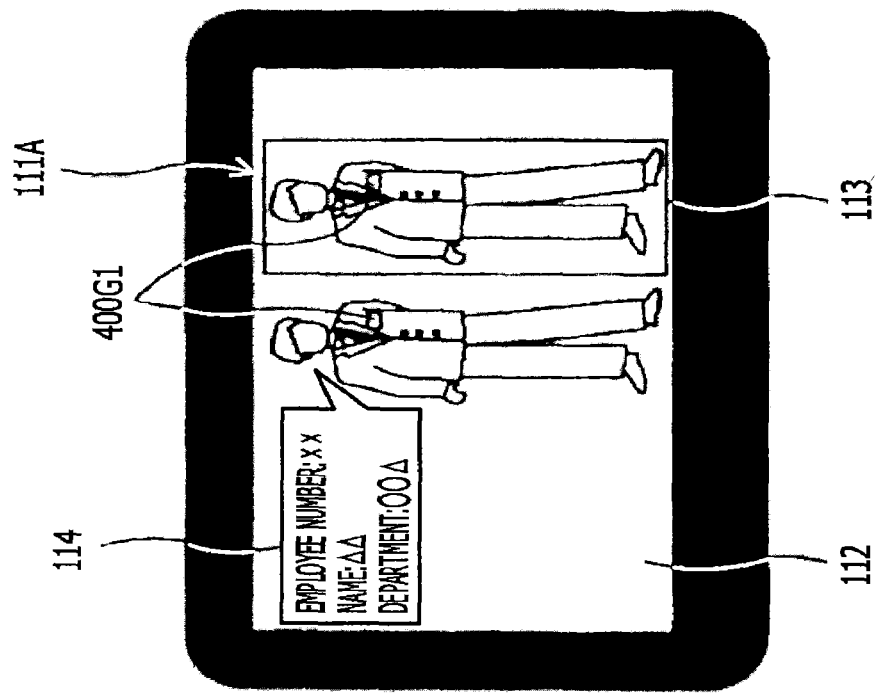

FIG. 13

| DIFFERENCE IN RESOLUTION | ERROR |
|---|---|
| 200 dpi OR MORE | 50mm |
| 400 dpi OR MORE | 100mm |
| ⋮ | ⋮ |
| ⋮ | ⋮ |

290

DISPLAY CONTROL DEVICE AND METHOD

CROSS-REFERENCE TO RELATED APPLICATION

This application is based upon and claims the benefit of priority from the prior Japanese Patent Application No. 2014-008744 filed on Jan. 21, 2014, the entire contents of which are incorporated herein by reference.

FIELD

The embodiments discussed here are related to a technology which supports a collating operation.

BACKGROUND

In the related art, there is a case in which identity verification by an operator (for example, security guard, or the like), not only authentication using identification information (ID) and a password of an access applicant is performed in an access management of a location or information. The identity verification operation by an operator is performed when the operator executes visual verification with respect to reference information such as a photograph (photograph of face or whole body) which is registered in advance, and a verification target. In addition, a related technology is disclosed in Japanese Laid-open Patent Publication No. 2005-092700, and Japanese Laid-open Patent Publication No. 2012-239004.

SUMMARY

According to an aspect of the invention, a display control device includes circuitry configured to detect a specific object that is supported by an authentication target in an image, obtain content data associated with the specific object, the content data including a registered image of a registered user and positional information between the specific object and the registered image, and control a display to superimpose the registered image on the image at a position based on the positional information in order to provide a comparison between the authentication target and the registered user.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram which describes a function of a device which includes the authentication system according to the first embodiment.

FIGS. 4A and 4B are diagrams which illustrate examples of reference destination tables.

FIG. 5 is a diagram which illustrates an example of a superposition definition table.

FIG. 6 is a diagram which illustrates an example of a reference information database.

FIGS. 11A and 11B are third diagrams which illustrate an example of the authentication result in the first embodiment.

FIG. 13 is a diagram which illustrates an example of an error determination table.

DESCRIPTION OF EMBODIMENTS

In a visual identity verification operation, it is not easy to discern the whole face, a part of the face, height, or the like, with high accuracy using a comparison of characteristics or sizes.

When characteristics of parts of a face, or the like, are compared, for example, there is a possibility that a hair style, glasses, or the like, may exercise influences on determinations. In addition, in comparison in parts, or the like, there is a case in which it is not easy to make a comparison when a size of a face is different, or the like, even when eyes are similar, for example. In addition, in a comparison in the whole body, there is a possibility that a change in clothes, a body shape, or the like, may exercise an influence on the comparison.

An object of the disclosed technology is to provide a display control program, a display control device, and a display control system which can perform a visual collating operation with high accuracy.

First Embodiment

Figure 1:
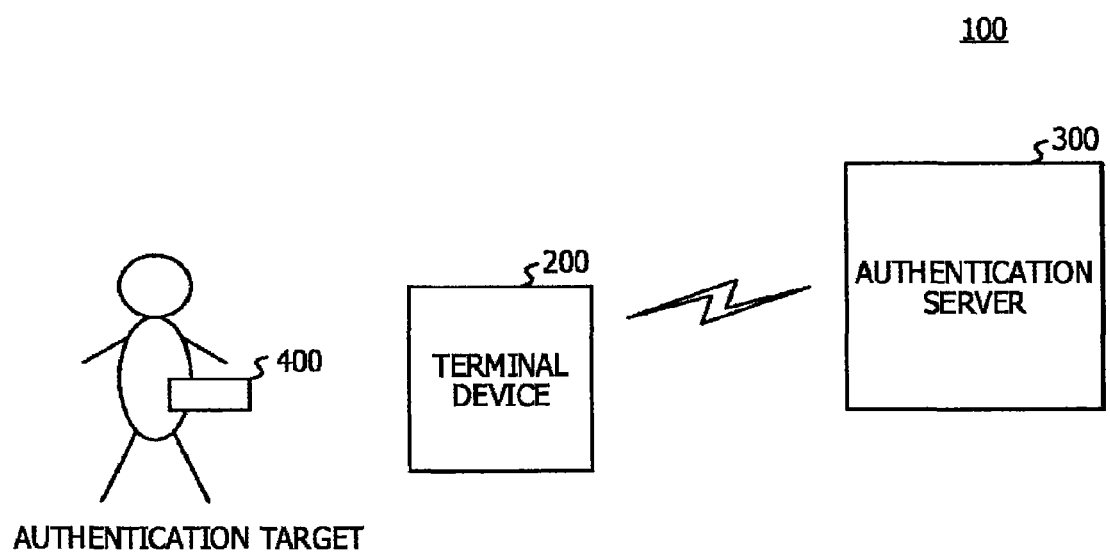
FIG. 1 is a diagram which illustrates an example of a system configuration of an authentication system according to a first embodiment.

Hereinafter, a first embodiment will be described with reference to drawings. FIG. 1 is a diagram which illustrates an example of a system configuration of an authentication system according to the first embodiment.

An authentication system 100 according to the embodiment includes a terminal device 200, and an authentication server 300. The terminal device 200 and the authentication server 300 are connected to each other through a wireless communication network, or the like, for example.

The terminal device 200 according to the embodiment has an imaging function, and images an image of a verification target who is wearing a predetermined marker 400. The authentication server 300 according to the embodiment receives a recognition of the marker 400 using the terminal device 200, and transmits reference information related to the verification target who is correlated with the marker 400 to the terminal device 200.

The terminal device 200 makes an identity verification operation easy using the terminal device 200 by displaying an imaged image which is imaged using the imaging function, and reference information which is related to a verification target which is received from the authentication server 300 in an overlapping manner. Accordingly, the authentication system 100 according to the embodiment also has a function of a display control system which performs a display control of the reference information in the terminal device 200. In addition, a detail of the reference information in the embodiment will be described later.

Hereinafter, the marker 400 according to the embodiment will be described.

According to the embodiment, a predetermined marker 400 which a verification target wears is set to an identification body which is referred to as an augmented reality (AR) marker.

The AR marker is a printed matter, or the like, on which a pattern which can measure a relative position or a relative angle with respect to an imaging apparatus is printed based on an imaged image in which the AR marker is photographed. That is, the AR marker is a pattern image which is a standard for specifying what a worker who possesses the terminal device 200 is viewing from where, when the AR marker is photographed using the imaging function of the terminal device 200.

The terminal device 200 according to the embodiment adjusts a position, a size, an orientation, and the like, of the reference information when being displayed according to a position, a size, an orientation, and the like, of the marker 400 which is included in the imaged image, and displays the reference information by overlapping the information with the imaged image.

The terminal device 200 according to the embodiment measures a relative position and a relative orientation (relative angle) between the marker 400 and the imaging apparatus using the projected image of the marker 400 in the imaged image. In addition, the terminal device 200 obtains identification information of a verification target corresponding to the AR marker by analyzing a pattern which is printed on the AR marker, and obtains reference information corresponding to the identification information from the authentication server 300. The terminal device 200 according to the embodiment may be a tablet terminal, a smartphone, or the like, for example.

The authentication system 100 according to the embodiment may be used in an identity verification operation, or the like, which is performed at an entrance when going into and out of a specific place, for example. The specific place may be a site of a company or a school, and may be an event site, or the like, for example.

In the following descriptions, a specific place is set to the inside of a site of a company, a verification target who is wearing a predetermined marker 400 being set to a person who is wearing an employee ID card, or the like, on which the AR marker is printed.

Figure 2:
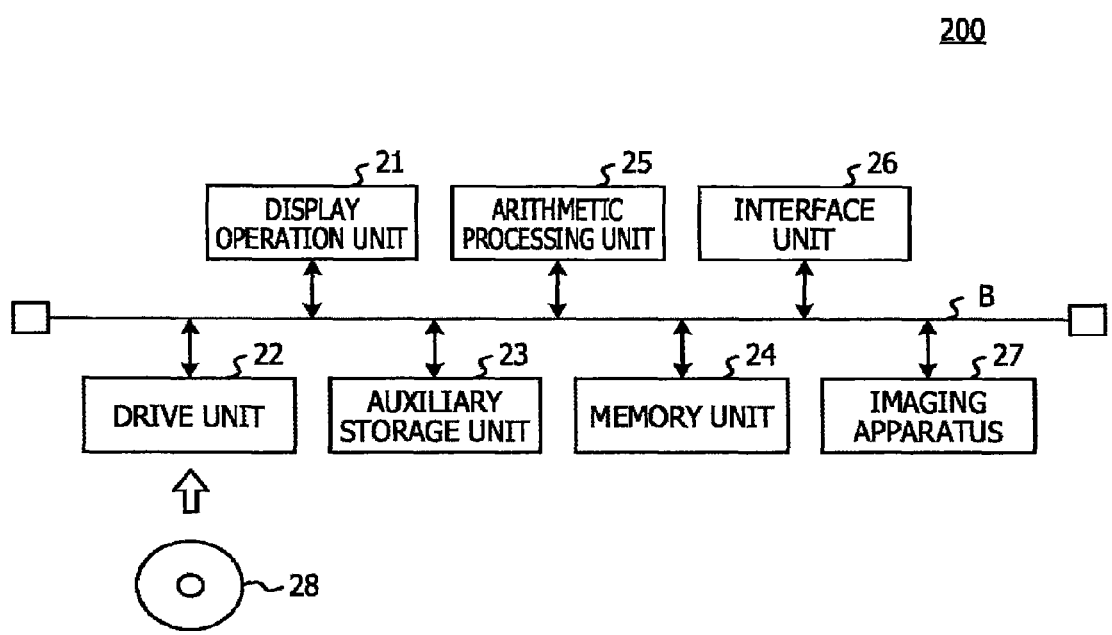
FIG. 2 is a diagram which illustrates an example of a hardware configuration of a terminal device.

FIG. 2 is a diagram which illustrates an example of a hardware configuration of a terminal device.

The terminal device 200 according to the embodiment includes a display operation unit 21 which is mutually connected to each other using a bus B, a drive unit 22, an auxiliary storage unit 23, a memory unit 24, an arithmetic processing unit 25, an interface unit 26, and an imaging unit 27.

The display operation unit 21 is a touch panel, or the like, and is used for inputting of various signals and displaying of various information.

The interface unit 26 includes a modem, a LAN card, or the like, and is used so as to be connected to a network. The imaging unit 27 includes an imaging element, and images an image.

An authentication program is at least a part of various programs which control the terminal device 200. The authentication program is provided using a distribution of a recording medium 28, downloading from a network, or the like, for example. As the recording medium 28 in which the authentication program is recorded, it is possible to use a recording medium of various types in which information is optically, electrically, or magnetically recorded such as a CD-ROM, a flexible disk, and a magneto-optical disc, and a semiconductor memory, or the like, in which information is electrically recorded such as a ROM, and a flash memory.

In addition, when the recording medium 28 in which the authentication program is recorded is set to the drive unit 22, the authentication program is installed in the auxiliary storage unit 23 from the recording medium 28 through the drive unit 22. The authentication program which is downloaded from a network is installed in the auxiliary storage unit 23 through the interface unit 26.

The auxiliary storage unit 23 stores the installed authentication program, and stores desired files, data, or the like. The memory unit 24 stores the authentication program by reading the program from the auxiliary storage unit 23 when a computer is started up. In addition, the arithmetic processing unit 25 executes various processes which will be described later, according to the authentication program which is stored in the memory unit 24.

In addition, the authentication server 300 according to the embodiment may be a desktop computer, or a notebook computer, for example. In such a case, the authentication server 300 includes an input unit including a keyboard, a mouse, or the like, and an output unit including a display, or the like, instead of the display operation unit 21. In addition, the authentication server 300 may be a tablet terminal. Since the authentication server 300 according to the embodiment is a general computer which includes the arithmetic processing unit and the memory unit, descriptions of a hardware configuration thereof will be omitted.

FIG. 3 is a diagram which describes a function of a device including the authentication system according to the first embodiment.

In the authentication system 100 according to the embodiment, the terminal device 200 includes a reference destination table 210. The reference destination table 210 according to the embodiment may be stored in the auxiliary storage unit 23 or the memory unit 24 of the terminal device 200.

The reference destination table 210 according to the embodiment is a table in which a marker ID for identifying a marker, and reference destination information corresponding to the marker ID are correlated with each other in advance. The reference destination information is information which is correlated with definition information which will be described later and the reference information, and specifies the definition information and the reference information corresponding to the marker ID. The reference destination table 210 is set to be registered in the terminal device 200 in advance by a manager, or the like, of the authentication system 100. Details of the reference destination table 210 will be described later.

In addition, the terminal device 200 according to the embodiment includes an imaging control unit 220, a marker recognition unit 230, a reference destination information transmission unit 240, a reference information obtaining unit 250, a definition information obtaining unit 260, a reference information correction unit 270, and a display control unit 280.

The imaging control unit 220 according to the embodiment controls operations of the imaging unit 27 when the imaging unit 27 is used by a user of the terminal device 200 (worker who performs identity verification operation). The imaging unit 27 according to the embodiment mainly images an image of a verification target who is wearing the marker 400.

The marker recognition unit 230 according to the embodiment identifies (recognizes) an image of the marker 400 included in an imaged image which is imaged using the imaging unit 27, and obtains identification information (hereinafter, referred to as marker ID) of the marker 400 corresponding to a marker by analyzing the marker image. In addition, the marker recognition unit 230 also obtains a size of the image of the marker 400, a position of the marker 400 in the imaged image, an angle (distortion in appearance) of the marker 400 in the imaged image, and the like.

The reference destination information transmission unit 240 refers to the reference destination table 210, obtains reference destination information which is correlated with the marker ID obtained by the marker recognition unit 230, and transmits the information to the authentication server 300.

The reference information obtaining unit 250 obtains reference information corresponding to the reference destination information from the authentication server 300. The definition information obtaining unit 260 obtains definition information corresponding to the reference destination information from the authentication server 300.

The reference information according to the embodiment is information (including image data and text data) which is displayed by being overlapped with the imaged image which is imaged using the imaging unit 27. The definition information according to the embodiment is information which definite a size, an angle, a position, or the like, of a display when displaying the reference information.

That is, the reference information and the definition information corresponding to the marker 400 of the embodiment are AR content data items which are displayed by corresponding to the marker 400. Details of the reference information and the definition information according to the embodiment will be described later.

The reference information correction unit 270 according to the embodiment corrects the reference information which is displayed by being overlapped with the imaged image based on a size, a position, an angle, or the like, of the image of the marker 400 in the imaged image which is obtained by the marker recognition unit 230. Detailed processes of the reference information correction unit 270 will be described later.

The display control unit 280 according to the embodiment displays the reference information which is corrected by the reference information correction unit 270 by overlapping the information with a position which is denoted by the definition information in the imaged image.

The authentication server 300 according to the embodiment includes an overlapping definition table 310, and a reference information database 320. The overlapping definition table 310 and the reference information database 320 according to the embodiment may be stored in the auxiliary storage unit and the memory unit of the of the authentication server 300 in advance, for example.

In the overlapping definition table 310 according to the embodiment, the reference destination information, a display position, a rotation angle, and a display size of the reference information corresponding to the reference destination information, and a file name, or the like, of the reference information are stored. In the reference information database 320 according to the embodiment, a photograph, personnel information, and the like, which are correlated with the reference destination information are stored. The overlapping definition table 310 and the reference information database 320 according to the embodiment are stored in the authentication server 300 in advance.

In addition, the authentication server 300 according to the embodiment includes a reference destination information obtaining unit 330, an information obtaining unit 340, and an information transmission unit 350.

The reference destination information obtaining unit 330 according to the embodiment obtains the reference destination information from the terminal device 200. The information obtaining unit 340 refers to the respective overlapping definition table 310 and reference information database 320, and obtains the definition information and the reference information which are correlated with the reference destination information. The information transmission unit 350 transmits the definition information and the reference information to the terminal device 200.

Hereinafter, the reference destination table 210 will be described with reference to FIGS. 4A and 4B. FIGS. 4A and 4B are diagrams which illustrate examples of the reference destination table. FIG. 4A illustrates an example of a table in which a marker ID and an employee number of a verification target are correlated with each other, and FIG. 4B illustrates an example of a table in which the employee number and a reference ID which is correlated with the definition information and the reference information are correlated with each other.

A reference destination table 210A illustrated in FIG. 4A has a marker ID and an employee number as items of information, and both are correlated with each other.

According to the reference destination table 210A in the embodiment, it is understood that, in an employee ID card of a person with an employee number of 012345, for example, a marker (AR marker) 400 of which a marker ID is identified as 1 is printed. In addition, according to the reference destination table 210A in the embodiment, it is understood that, in an employee ID card of a person with an employee number of 012346, for example, a marker (AR marker) 400 of which a marker ID is identified as 2 is printed.

In addition, in the reference destination table 210A according to the embodiment, a plurality of marker IDs may be correlated with one employee number, for example. In the example in FIG. 4A, it is understood that a marker ID "1" and a marker ID "10" are correlated with the employee number of 012345.

When a plurality of marker IDs are correlated with one employee number in this manner, it is possible to substitute an employee ID card which is printed with the marker of the marker ID "10", when an employee ID card which is printed with the marker of the marker ID "1" is lost, and to save time and effort of performing a registration of the reference information again, which will be described later.

A reference destination table 210B illustrated in FIG. 4B has an employee number and a reference ID as items of information, and both are correlated with each other.

According to the reference destination table 210B in the embodiment, it is understood that the employee number 012345 is correlated with a reference ID of "01", for example.

According to the embodiment, the reference destination information corresponding to the marker ID may be set to an employee number which is applied to a verification target. In addition, according to the embodiment, the reference destination information corresponding to the marker ID may be set to a reference ID which is correlated with the marker ID through the employee number.

According to the embodiment, for example, it is possible to change the definition information and the reference information which are correlated with the marker ID, only by changing a reference ID which is correlated with the employee number in the reference destination table 210B.

Specifically, for example, a case in which the reference information and the definition information corresponding to the employee number 012345 are updated is taken into consideration. In this case, the updated reference information and the definition information may be stored in the authentication server 300 by being correlated with a new reference ID, and the new reference ID may be correlated with the employee number 012345 in the terminal device 200. In this manner, it is possible to cause the employee number 012345, the updated reference information, and the definition information to be correlated with each other. Accordingly, when the reference destination information is set to the reference ID, it is possible to easily change the reference information and the definition information which are correlated with the marker ID.

In the following descriptions of the embodiment, a case in which the reference destination information corresponding to the marker ID is set to the reference ID will be described.

Subsequently, the overlapping definition table 310 and the reference information database 320 according to the embodiment will be described. FIG. 5 is a diagram which illustrates an example of the overlapping definition table.

The overlapping definition table 310 according to the embodiment includes a reference ID, position information, a display size, a rotation angle, and a file name as items of information, and items other than those are correlated with an employee number. According to the embodiment, the position information, the display size, the rotation angle, and the file name which are correlated with the reference ID are set to definition information corresponding to the reference ID.

The position information according to the embodiment is information which denotes a relative positional relationship between reference information and an image of the marker 400 included in an imaged image, and denotes a display position of the reference information when displaying the reference information by overlapping the information with the imaged image. According to the embodiment, when an image of the marker 400 is recognized in the imaged image which is imaged using the imaging unit 27, the reference information is displayed with respect to the marker 400 at a position which is defined by the position information. In addition, in the example in FIG. 5, the position information is set to be denoted using three-dimensional coordinates, however, the position information maybe denoted using two-dimensional coordinates.

The display size according to the embodiment denotes a display size of the reference information when displaying the reference information. Details of the position information and display size according to the embodiment will be described later.

The rotation angle according to the embodiment denotes a rotation angle of the reference information when displaying the reference information by overlapping the information with the imaged image. The file name is a file name of an image which is displayed as reference information.

In addition, according to the embodiment, the overlapping definition table 310 is set to be stored in the authentication server 300 along with the reference information in advance, however, there is no limitation to this. For example, when the image of the marker 400 is included in the image which is registered as the reference information, for example, definition information may be generated from the image of the marker 400 included in the reference information after the terminal device 200 obtains the reference information from the authentication server 300.

FIG. 6 is a diagram which illustrates an example of a reference information database. The reference information database 320 according to the embodiment includes a reference ID, a face picture, a photograph of the whole body, and personnel information as items of information, and the face picture, the photograph of the whole body, and the personnel information are correlated with the employee number.

In the example in FIG. 6, a file name of an image file which is a face picture of an employee of the employee number which is correlated with the reference ID "01" is 1.jpg, a file name of an image file of the photograph of the whole body is 11.jpg, and a file name of a text file which is personnel information is text 1. That is, in the example in FIG. 6, reference information corresponding to the reference ID "01" becomes a face photograph 1.jpg, the whole body photograph 11.jpg, and personnel information text 1. In addition, the personnel information according to the embodiment includes a name, an affiliated division, or the like, of a person corresponding to an employee number, and a photograph number, for example.

Figure 7A:
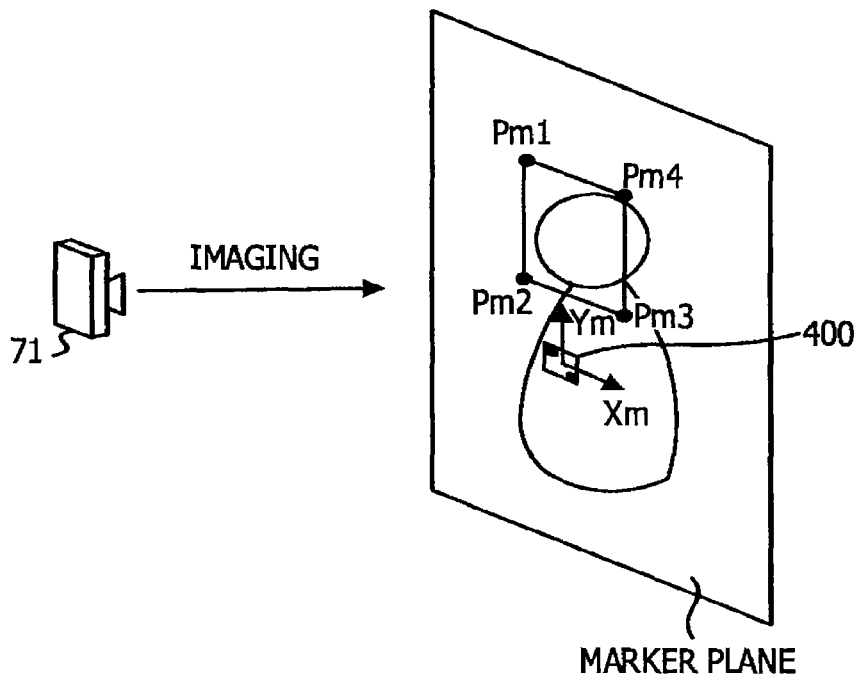
FIGS. 7A and 7B are diagrams which describe images which are included in the reference information.
Figure 7B:
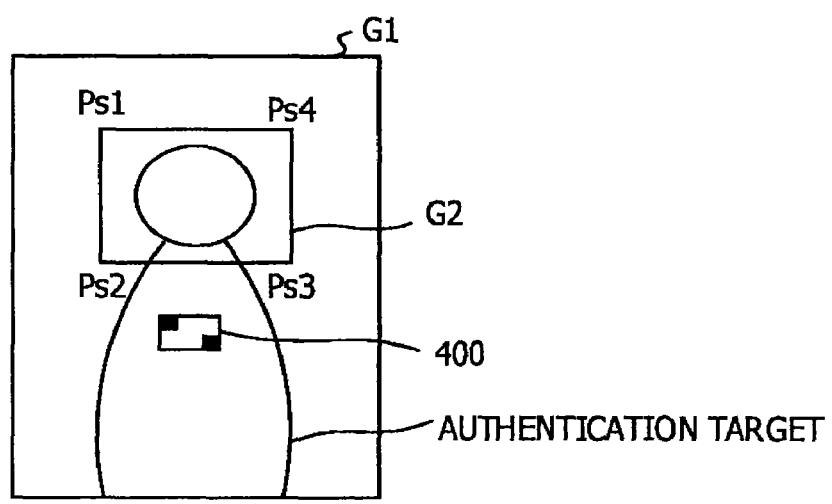

Subsequently, position information included in the definition information according to the embodiment will be described with reference to FIGS. 7A and 7B. FIGS. 7A and 7B are diagrams which describe images included in the reference information. FIG. 7A is a diagram which describes imaging of an image which is stored in the reference information database 320, and FIG. 7B illustrates an example of an image which is obtained by the imaging.

When imaging an image, a person who is an imaging target is imaged by wearing the marker 400. More specifically, for example, imaging is performed in a state in which the person (employee) as the imaging target is wearing an employee ID card on which the marker 400 is printed.

Hereinafter, a sequence of storing an image as the reference information in the reference information database 320 after obtaining an imaged image G1 illustrated in FIG. 7B will be described. In addition, the following sequence is executed using a computer such as the authentication server 300 which obtains the imaged image G1, for example.

For example, when an image of a face picture is stored in the reference information database 320, an image of a region G2 of a face part which is selected in the imaged image G1 is stored.

According to the embodiment, for example, each point (Ps1, Ps2, Ps3, and Ps4) which defines the region G2 is subjected to a perspective conversion, and is converted into coordinates (Pc1, Pct, Pc3, and Pc4) on a real space. At this time, the depth from a camera 71 to an object is set to a value corresponding to a position of the marker 400. For example, the depth from the camera 71 to the object may be set to a value which is the same as the depth of the marker 400.

Subsequently, the (Pc1, Pct, Pc3, and Pc4) are converted into coordinates (Pm1, Pmt, Pm3, and Pm4) of a marker coordinate system (Xm, Ym, and Zm) using a model view conversion. The model view conversion is a conversion in which an object on local coordinates is moved to world coordinates, and is moved to a position which is viewed from a viewpoint.

Here, the authentication server 300 stores the converted coordinates in the overlapping definition table 310 by correlating the coordinates with a reference ID corresponding to the marker ID of the marker 400 as position information. In addition, the authentication server 300 sets an image in a region G2 to be a face picture, and stores the image in the reference information database 320 by correlating the image with reference ID corresponding to the marker ID of the marker 400.

According to the embodiment, in this manner, it is possible to display the image in the region G2 (face picture) so that the image is present in a region surrounded by points Pm1, Pm2, Pm3, and Pm4 with respect to the marker 400 when the marker 400 is recognized, by defining a positional relationship between the image included in the reference information and the image of the marker 400. In addition, according to the embodiment, a predetermined value a (approximately 40 cm) is added to each of Xm coordinates of the points Pm1, Pm2, Pm3, and Pm4, and then the coordinates may be stored in the overlapping definition table 310 as position information. As a result, it becomes a display which is easy for a worker, who performs work for collating the imaged image with the reference information, to view, since the face picture is displayed next to a face of a person who wears the marker 400, as the reference information.

In addition, position information which denotes a relative positional relationship between the image which is included in the reference information and the image of the marker 400 may not be the above described coordinates.

For example, when a shape of the marker 400 is set to a rectangle, the width of the image of the marker 400 is set to W, and the height is set to H, an X coordinate and a Y coordinate of the point Pm1 of the region G2 may be denoted as the width W and the height H of the image of the marker 400. Specifically, there may be a calculation in which the X coordinate of the point Pm1 is a position of the width W×2 of the image of the marker 400 from a center point of the image of the marker 400, and the Y coordinate of the point Pm1 is a position of the height H×5 of the image of the marker 400 from the center point of the image of the marker 400, or the like.

In addition, in a display size of the reference information which is included in the definition information of the embodiment, for example, a size in the X axis direction may be set to the width W×5 of the image of the marker 400, and a size in the Y axis direction may be set to the height H×3 of the image of the marker 400, or the like.

Figure 8:
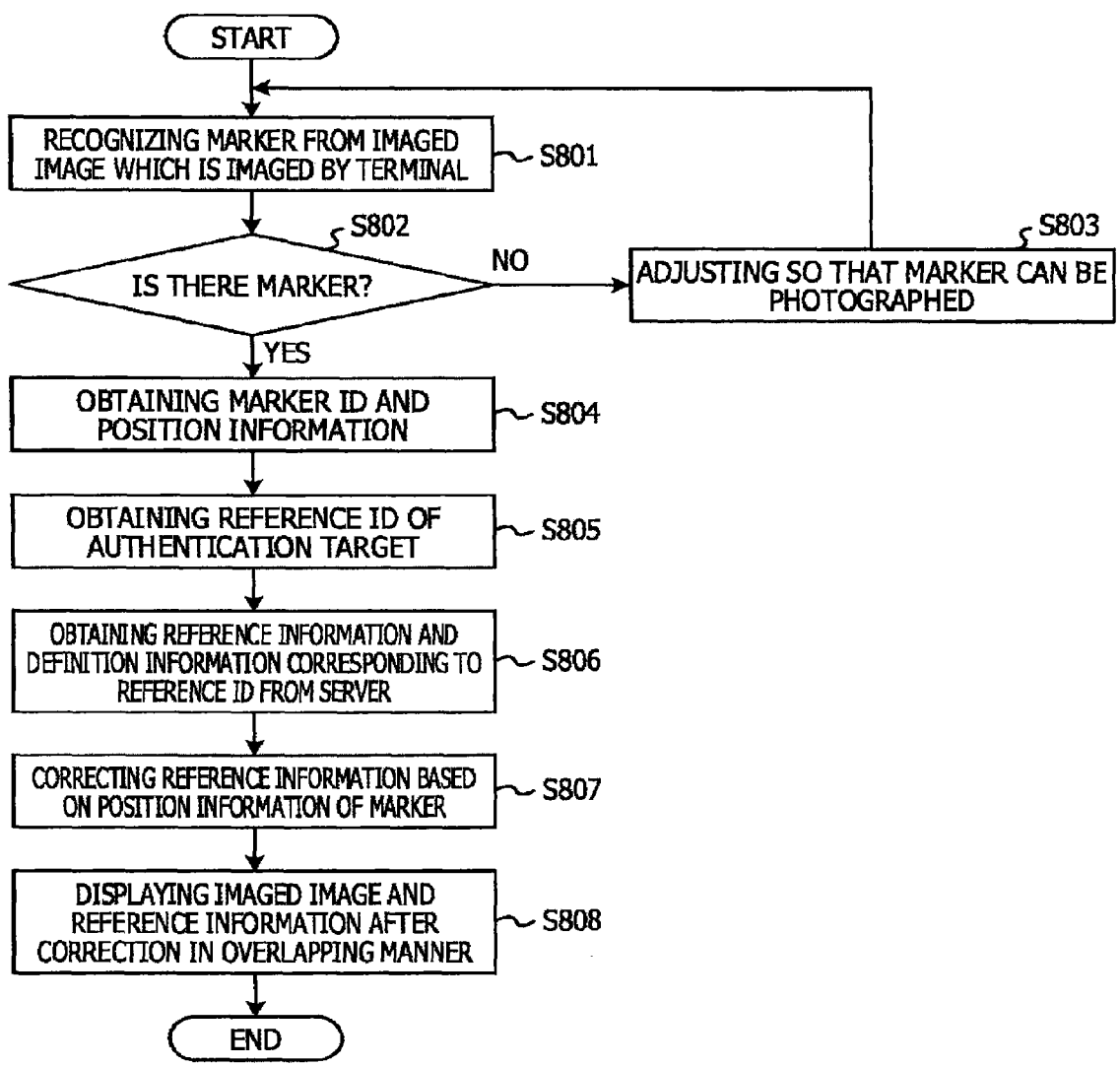
FIG. 8 is a flowchart which describes operations of an authentication system according to the first embodiment.

Subsequently, operations of the authentication system 100 according to the embodiment will be described with reference to FIG. 8. FIG. 8 is a flowchart which describes operations of the authentication system according to the first embodiment.

In the authentication system 100 according to the embodiment, the terminal device 200 recognizes an image of the marker 400 from an imaged image of a verification target which is imaged using the imaging unit 27, using the marker recognition unit 230 (step S801). Subsequently, the terminal device 200 according to the embodiment determines whether or not the image of the marker 400 is recognized in the imaged image (step S802). When the image is not recognized in step S802, the terminal device 200 causes the display operation unit 21 to display that it is not possible to obtain the image of the marker 400, for example, and causes a worker to adjust a position of the terminal device 200 (step S803), and the process returns to step S801.

When the marker 400 is recognized in step S802, the marker recognition unit 230 analyzes the image of the marker 400, and obtains a marker ID of the marker 400, and state information of the marker which denotes a state of the marker 400 at a time of imaging (step S804). In the marker state information according to the embodiment, for example, marker position information which denotes a position of the image of the marker 400 in the imaged image, information denoting a size of the image of the marker 400 in the imaged image, an angle of the marker 400 with respect to the imaging unit 27 at the time of imaging, and the like, are included.

Subsequently, the reference destination information transmission unit 240 refers to the reference destination tables 210A and 210B, and obtains a reference ID which is correlated with the marker ID (step S805).

The terminal device 200 transmits the reference ID to the authentication server 300 using the reference destination information transmission unit 240, and obtains reference information and definition information corresponding to the reference ID using the reference information obtaining unit 250 and the definition information obtaining unit 260 (step S806).

Subsequently, the reference information correction unit 270 corrects the reference information based on the marker state information which is obtained in step S804 (step S807).

Hereinafter, the correction of the reference information using the reference information correction unit 270 according to the embodiment will be described. The reference information correction unit 270 according to the embodiment may calculate a distance between the terminal device 200 and a verification target from information denoting a size of the marker 400 which is denoted in the marker state information, and may perform a correction of changing a display size of an image of the reference information according to the distance.

In addition, the reference information correction unit 270 according to the embodiment may rotate the image of the reference information according to an angle of the marker 400 with respect to the imaging unit 27 at the time of imaging, which is included in the marker state information, for example.

According to the embodiment, as described above, the marker state information which denotes a positional relationship between the terminal device 200 and the marker 400 is obtained from the image of the marker 400 which is included in the imaged image, and the image included in the reference information is corrected based on the marker state information. Due to the correction, it is possible to set the image included in the reference information to an image which is photographed under the same conditions as that of the image of the verification target which is projected on the imaged image. Accordingly, according to the embodiment, it is possible to perform a visual collation of the image included in the reference information with the imaged image with high accuracy, and to make a visual identity verification operation easy.

Subsequently, the display control unit 280 displays the corrected reference information by overlapping the information with the imaged image (step S808).

In addition, in FIG. 8, it is set such that the reference information is corrected by obtaining the marker state information from the imaged image, however, there is no limitation to this. The corrected image may be the imaged image, not the image of the reference information.

Hereinafter, an authentication result using the authentication system 100 according to the embodiment will be described with reference to FIGS. 9A to 11B.

Figure 9B:
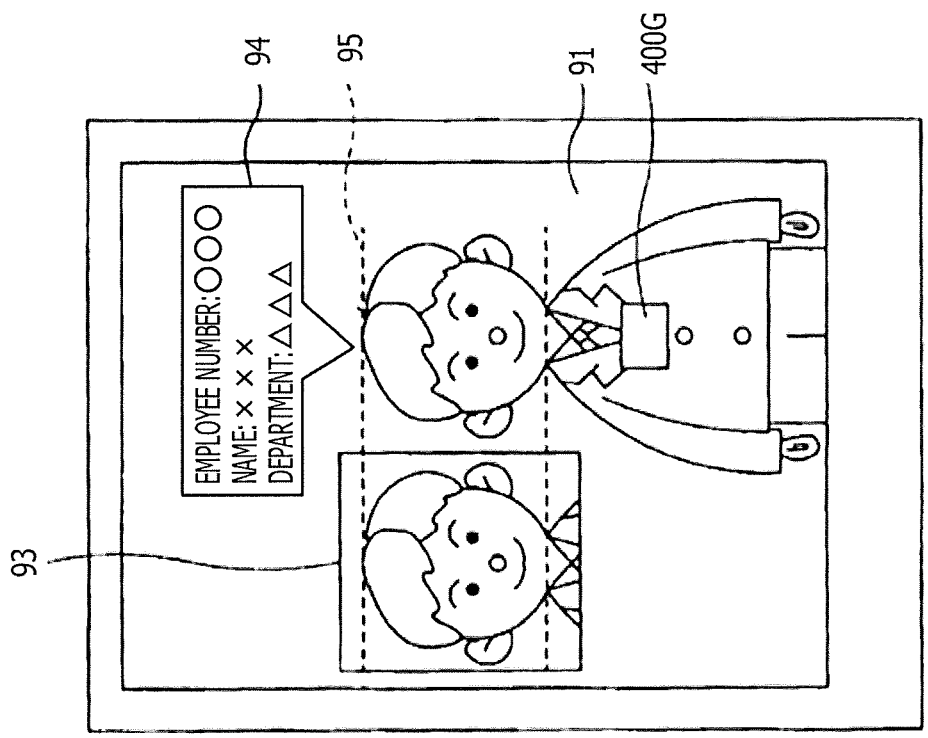
FIGS. 9A and 9B are first diagrams which illustrate an example of an authentication result in the first embodiment.
Figure 9A:
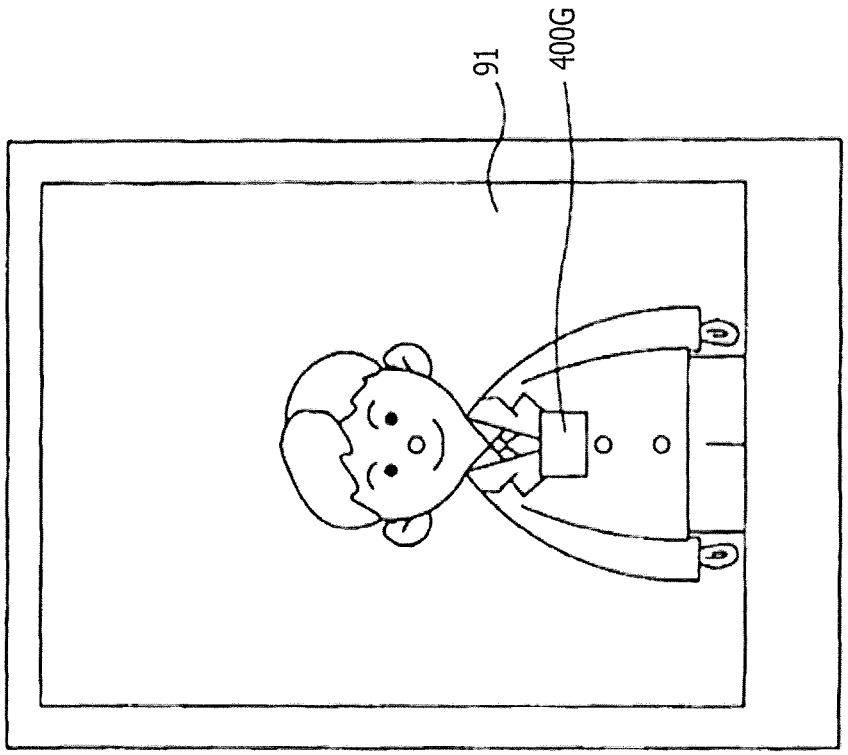

FIGS. 9A and 9B are first diagrams which illustrate an example of the authentication result in the first embodiment. FIG. 9A illustrates an example of an imaged image in which a verification target is imaged using the terminal device 200 by a worker who performs the identity verification operation using the authentication system 100. FIG. 9B is a diagram which illustrates an example of an image which is formed by overlapping the reference information with the imaged image.

In the example in FIGS. 9A and 9B, an image 400G of the marker 400 is included in an imaged image 91. The marker recognition unit 230 according to the embodiment recognizes the image 400G from the imaged image 91, and analyzes the image, and obtains the marker ID of the marker 400, and marker state information which denotes a state of the marker 400 at the time of imaging the imaged image 91.

In addition, the terminal device 200 obtains definition information corresponding to the marker ID from the overlapping definition table 310 using the definition information obtaining unit 260, and obtains pieces of reference information 93 and 94 corresponding to the marker ID from the reference information database 320 using the reference information obtaining unit 250. The pieces of reference information 93 and 94 are displayed by being overlapped with the imaged image 91 based on the definition information and the marker state information. In the examples in FIGS. 9A and 9B, an image of a face picture is used as the reference information 93.

In the example illustrated in FIG. 9B, in position information included in the definition information, a display position of the reference information 93 is defined to be present next to a face of the verification target, and it is possible to easily perform the identity verification operation. In the examples in FIGS. 9A and 9B, it is possible to confirm that a verification target who is included in the imaged image 91 is the same person as a person with an employee number of ooo using the pieces of reference information 93 and 94.

According to the embodiment, it is possible to cause a worker who performs a confirmation operation to perform a display including information on height, as well, by displaying a pointer 95 which becomes a standard for determining the height of the verification target, and to allow the visual identity verification operation to be performed easily.

Figure 10A:
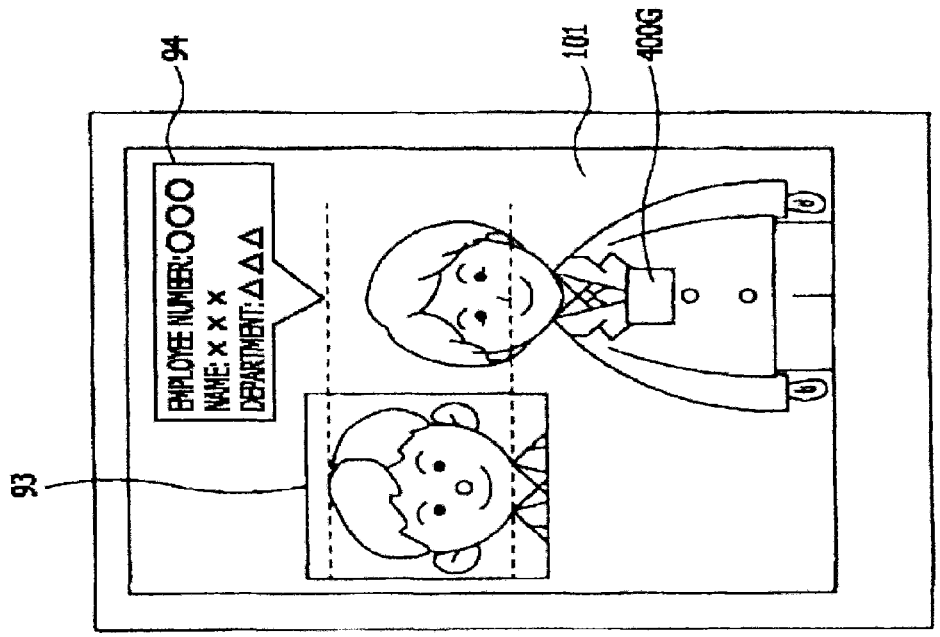
FIGS. 10A and 10B are second diagrams which illustrate an example of the authentication result in the first embodiment.
Figure 10B:
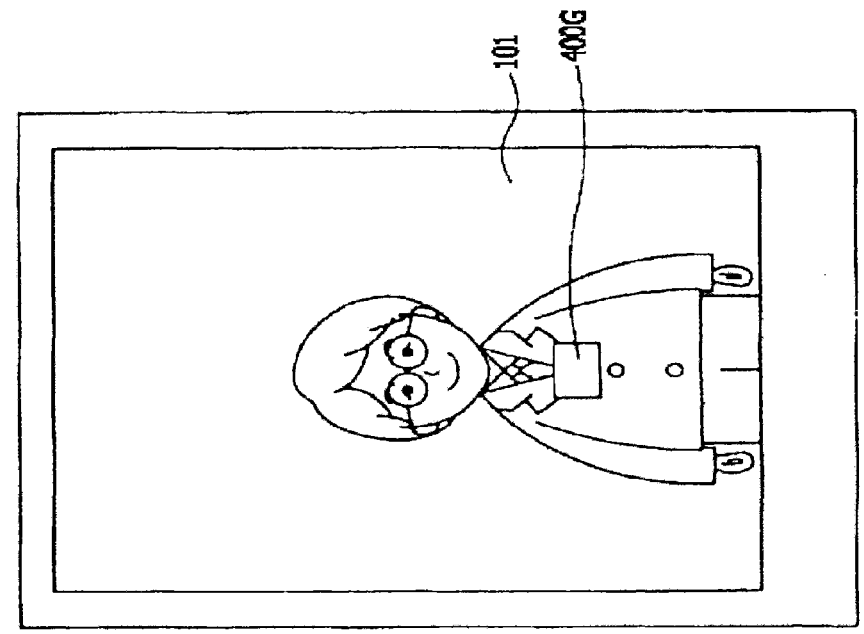

FIGS. 10A and 10B are second diagrams which illustrate an example of an authentication result according to the first embodiment. FIG. 10A illustrates an example of an imaged image in which a worker who performs the identity verification operation using the authentication system 100 images a verification target using the terminal device 200. FIG. 10B is a diagram which illustrates an example of an image in which reference information is overlapped with the imaged image.

In FIGS. 10A and 10B, an example in which the verification target who is included in an imaged image 101 is not the same person as a person with an employee number of ooo is illustrated. The above described case is considered as a case in which, for example, a different person from the person with the employee number of ooo is wearing an employee ID card of the person with the employee number of ooo.

In FIG. 10B, the pieces of reference information 93 and 94 which are obtained from the image 400G are displayed on the imaged image 101. Position information of the reference information 93 is defined to be displayed next to a face of a person, when the person with the employee number of ooo is the verification target, and is displayed on the imaged image 101 according to the position information.

For this reason, as illustrated in FIG. 10B, when a person with a different height from the person with the employee number of ooo is photographed in the imaged image, for example, a deviation in height occurs between a display position of the reference information 93 and a position of a face of a person which is photographed in the imaged image 101 as a verification target. Therefore, according to the embodiment, it is possible to easily determine that the verification target who is photographed in the imaged image is not the person with the employee number of ooo due to the condition of the height.

FIGS. 11A and 11B are third diagrams which illustrate an authentication result according to the first embodiment. FIG. 11A illustrates a case in which the verification target and the reference information match with each other. FIG. 11B illustrates a case in which the verification target and the reference information do not match with each other. FIGS. 11A and 11B illustrate an example of a case in which a whole body picture of the verification target is used as the reference information.

On a screen 111A of the terminal device 200 illustrated in FIG. 11A, an imaged image 112, and pieces of reference information 113 and 114 which are overlapped with the imaged image 112 are displayed.

In the example in FIG. 11A, an employee number corresponding to an image 400G1 of the marker 400 is xx, and the pieces of reference information 113 and 114 correspond to the employee number of xx. The reference information 113 is a whole body picture of a person with the employee number of xx.

On a screen 111B of the terminal device 200 which is illustrated in FIG. 11B, an imaged image 115, and pieces of reference information 113 and 114 which are overlapped with the imaged image 115 are displayed.

In FIGS. 11A and 11B, a whole body picture of the person with the employee number of xx is displayed next to images of verification targets who are included in both the imaged images 112 and 115, as the reference information 113.

In FIG. 11A, it is understood that then the image of the verification target in the imaged image 112 matches the reference information 113. In addition, in FIG. 11B, the image of the verification target in the imaged image 115 does not match the reference information 113.

As described above, according to the embodiment, when the image of the reference information is set to an image of a picture of the whole body, it is possible to easily perform a visual identity verification operation even when a distance from the verification target to the terminal device 200 is great, for example. In addition, according to the embodiment, when the image of the reference information is set to the image of the whole body picture, information on the height, a size of each part of the body, or the like, is included in the reference information, and it is possible to reduce an influence on a determination of the identity verification operation due to a change in body shape, clothes, or the like, for example.

In addition, in the above descriptions, an example in which reference destination information which is correlated with the marker ID is set to a reference ID has been described, however, there is no limitation to this. According to the embodiment, it is possible to perform the same processes even when the reference destination information is set to an employee number. When the reference destination information is set to the employee number, items of the reference IDs of the overlapping definition table 310 and the reference information database 320 are set to the employee number.

In addition, in the above descriptions, a form is described in which the embodiment is used in the identity verification operation, however, there is no limitation to this. The embodiment may be used in an operation, or the like, in which whether or not a height of a person who is a confirmation target satisfies a limit is determined, in an amusement park, or the like, for example.

Second Embodiment

A second embodiment will be described below with reference to drawings. In the second embodiment, a resolution of an imaged image is compared to a resolution of an image of reference information, differently from the first embodiment. Accordingly, in descriptions of the second embodiment, only differences from the first embodiment will be described, the same reference numerals as those used in the descriptions of the first embodiment are given to elements having the same functional configuration as those of the first embodiment, and descriptions thereof will be omitted.

Figure 12:
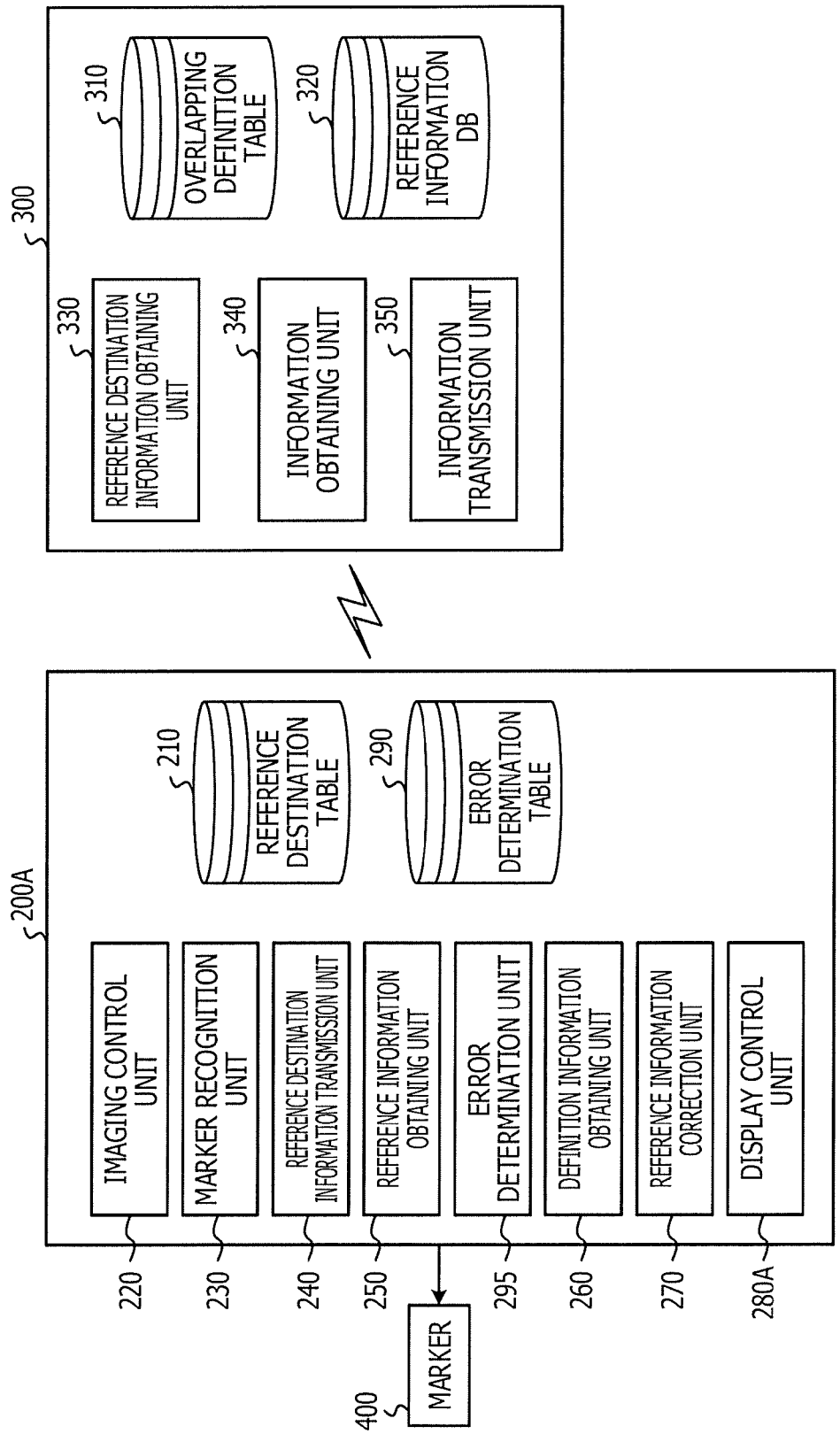
FIG. 12 is a diagram which describes a function of a device which is included in an authentication system according to a second embodiment.

FIG. 12 is a diagram which describes a function of a device included in an authentication system in the second embodiment. A terminal device 200A according to the embodiment includes an error determination table 290, and an error determination unit 295, in addition to each unit included in the terminal device 200 according to the first embodiment. In addition, the terminal device 200A according to the embodiment includes a display control unit 280A.

The terminal device 200A according to the embodiment compares a resolution of an imaged image to a resolution of an image of reference information, for example, and determines an error of a display size of the image of the reference information when overlapping the image of the reference information with the imaged image according to a difference in resolution.

The error determination unit 295 according to the embodiment determines whether or not a difference between the resolution of the imaged image and the resolution of the image included in the reference information is equal to or greater than a predetermined value. In addition, the error determination unit 295 refers to the error determination table 290 when the difference in resolution is equal to or greater than the predetermined value, and obtains an error value of a display size of the image of the reference information corresponding to the difference in resolution. In addition, the resolution included in the reference information may be registered in advance. In addition, the resolution of the imaged image may be obtained when an image of the marker 400 included in the imaged image is analyzed.

The display control unit 280A according to the embodiment displays a pointer corresponding to the error value at a time of displaying the image of the reference information when the error determination unit 295 obtains the error value.

FIG. 13 is a diagram which illustrates an example of the error determination table.

The error determination table 290 according to the embodiment includes a difference in resolution and an error as information items, and the difference in resolution and the error are correlated with each other.

Hereinafter, an error of a display size of an image included in the reference information according to the embodiment will be described. Hereinafter, for example, a case in which a resolution of an image which is registered as reference information is lower than that of an imaged image will be described. In addition, the case in which the resolution of the image included in the reference information is low is a case in which an image which is a face portion cut out from a whole body picture, and is enlarged, or the like, is registered as a face picture of the reference information, or the like, for example.

When the resolution of the image of the reference information is lower than that of the imaged image, for example, an edge rises in an outer shape of an object in the image of the reference information, and as a result, a line in drawing becomes thick compared to an imaged image with high resolution. When the line in the drawing becomes thick, there is a case in which a display size become larger due to the thick line compared to an image with high resolution even in the same image.

In the error determination table 290 according to the embodiment, an error of a display size when a difference in resolution is 200 dpi is 50 mm. The error denotes a difference in thickness between thickness of a line in an image with high resolution and thickness of a line in an image of which a resolution is lower by 200 dpi compared to the image.

The error determination table 290 according to the embodiment is a table in which a relationship between a resolution and an error is correlated with each other using a measured value of thickness of a line corresponding to a difference in resolution, or the like, for example.

In the terminal device 200A according to the embodiment, as described above, an error of a display size of an image which occurs from the thickness of a line due to a difference in resolution is taken into consideration, and a pointer which denotes the fact is displayed when the error occurs.

Figure 14:
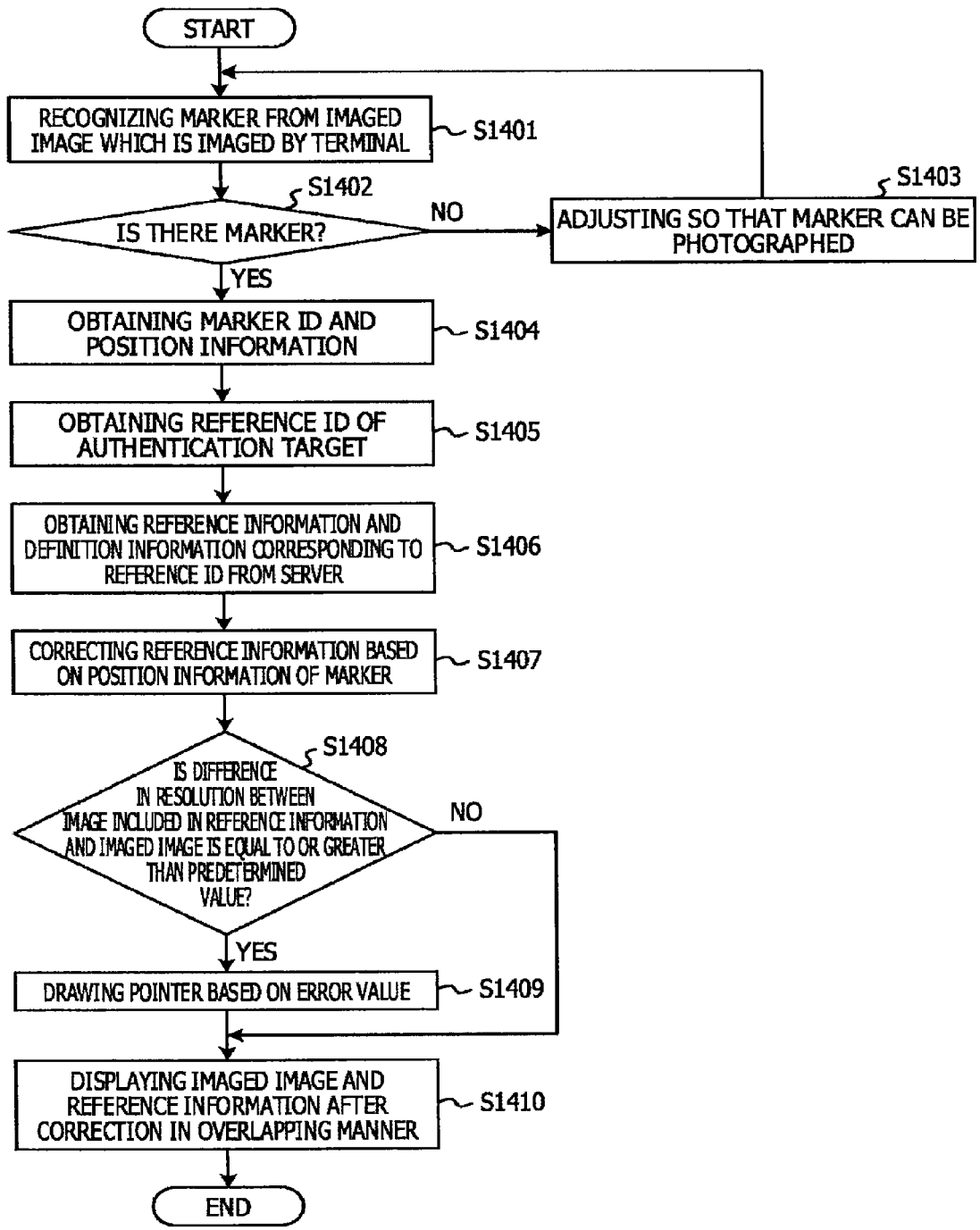
FIG. 14 is a flowchart which describes operations of the authentication system in the second embodiment.

FIG. 14 is a flowchart which describes operations of an authentication system according to the second embodiment.

Since processes from steps S1401 to S1407 in FIG. 14 are the same as the processes from steps S801 to S07 in FIG. 8, descriptions thereof will be omitted.

Subsequently to step S1407, the terminal device 200A determines whether or not a difference between a resolution of the imaged image and a resolution of an image included in the reference information is equal to or greater than a predetermined value by the error determination unit 295 (step S1408).

When the difference in resolution is less than the predetermined value in step S1408, the process of the terminal device 200A proceeds to step S1410 which will be described later. When the difference in resolution is equal to or greater than the predetermined value in step S1408, the error determination unit 295 refers to the error determination table 290, draws a pointer based on the error value (step S1409), and the process proceeds to step S1410.

Since the process in step S1410 is the same as the process in step S808 in FIG. 8, descriptions thereof will be omitted.

Figure 15:
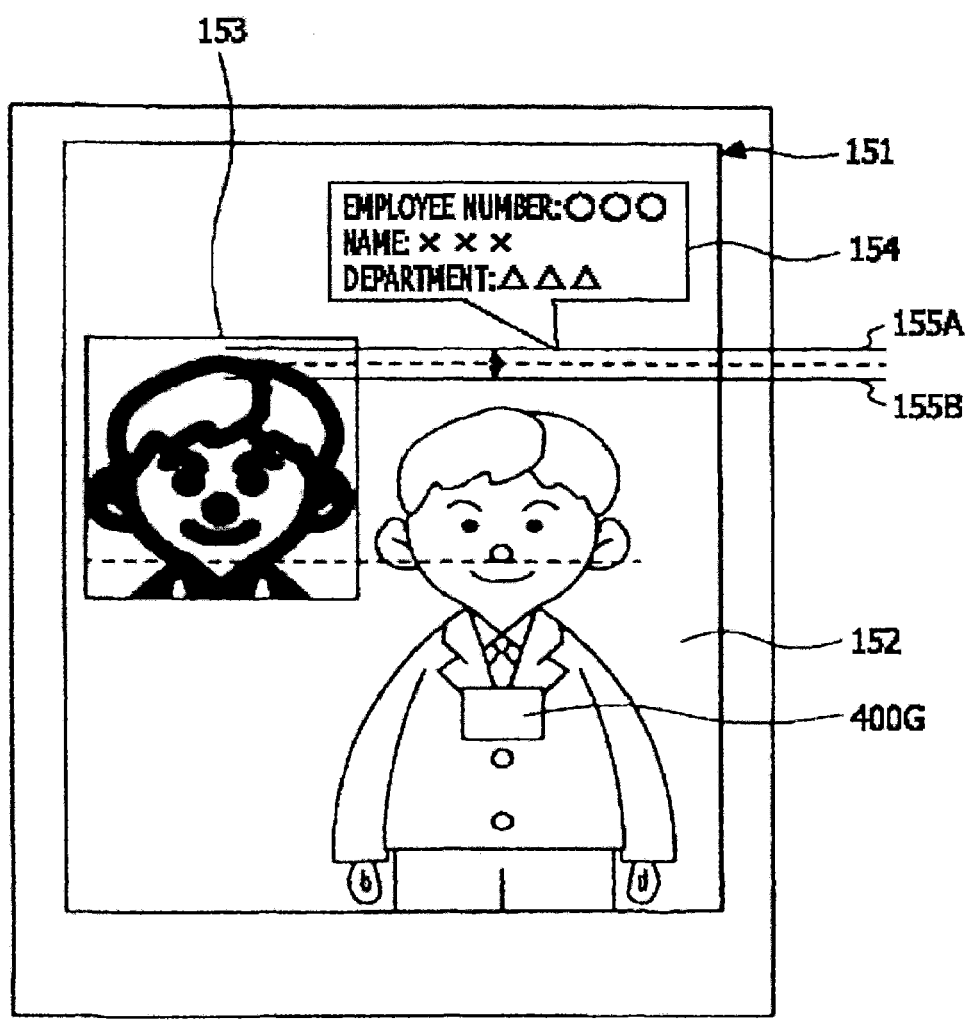
FIG. 15 is a diagram which illustrates an example of an authentication result in the second embodiment.

FIG. 15 is a diagram which illustrates an example of an authentication result in the second embodiment.

Pieces of reference information 153 and 154 are overlapped with an imaged image 152 on a screen 151 which is illustrated in FIG. 15. The reference information 153 displayed on the screen 151 is an image of which a resolution is lower than the imaged image 152 by a predetermined value or more, and it is understood that a line in drawing becomes thicker than a line in drawing of the imaged image 152.

Therefore, according to the embodiment, for example, pointers 155A and 155B which denote an error of a display size which occurs due to the thickness of a line are displayed in the vicinity of a top of head of a face picture of the reference information 153. The error of the display size is an error between a display size of an image of a verification target in the imaged image 152 and a display size of an image of the face picture in the reference information 153.

When the top of head of the image of the verification target in the imaged image 152 comes between the pointers 155A and 155B on the screen 151, it is possible to determine that height of the verification target in the imaged image 152, and height of a person in the face picture in the reference information 153 are approximately the same.

As described above, according to the embodiment, it is possible to cause a worker who performs an identity verification operation to recognize an error which occurs due to a difference between a resolution of an image included in the reference information and a resolution of the imaged image, and to contribute to an increase in accuracy of the visual identity verification operation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A display control device comprising:
    circuitry configured to:
        detect a specific object that is supported by an authentication target in an image,
        obtain content data associated with the specific object, the content data including a registered image of a registered user and positional information between the specific object and the registered image, and
        control a display to superimpose the registered image on the image at a position based on the positional information and to superimpose pointer information on the image, in order to provide a comparison between the authentication target and the registered user, wherein
    the pointer information includes at least one of a line that extends horizontally from a top portion of a face of the registered user, or another line that extends horizontally from a bottom portion of the face of the registered user.

2. The display control device according to claim 1, wherein the circuitry is configured to superimpose supporting information on the image based on the face of the registered user within the registered image.

3. The display control device according to claim 2, wherein the supporting information includes the pointer information in order to provide the comparison between a height of the authentication target and a height of the registered user.

4. The display control device according to claim 2, wherein the circuitry is configured to:
    acquire another image of the registered user,
    detect the specific object in the another image,
    acquire an input for designating an area in the another image to correspond to the registered image,
    generate the positional information based on a position of the specific object in the another image and a position of the area, and
    store, into a memory, the registered image and the positional information associated with the specific object.

5. The display control device according to claim 4, wherein the circuitry is configured to generate the positional information, which defines the position for the registered image, based on an offset with respect to the position of the area in the another image.

6. The display control device according to claim 5, wherein the registered image is disposed adjacent to a face of the authentication target in the image.

7. The display control device according to claim 5, wherein the supporting information includes at least one of a name of the registered user, an employee number of the registered user, or department information of the registered user.

8. The display control device according to claim 5, wherein the supporting information includes the pointer information in order to provide the comparison between a height of the authentication target and a height of the registered user.

9. The display control device according to claim 1, wherein the specific object is a marker.

10. The display control device according to claim 9, wherein the marker is printed on an identification card supported by the authentication target.

11. A display control device comprising:
    circuitry configured to:
        detect a specific object that is supported by an authentication target in an image,
        obtain content data associated with the specific object, the content data including a registered image of a registered user and positional information that defines a particular distance with respect to the specific object and the registered image, and
        control a display to superimpose the registered image on the image at a position based on the positional information and to superimpose pointer information on the image based on a height of the registered user within the registered image, wherein
    the pointer information includes at least one of a line that extends horizontally from a top portion of a face of the registered user, or another line that extends horizontally from a bottom portion of the face of the registered user.

12. The display control device according to claim 11, wherein the circuitry is configured to:
    acquire another image of the registered user,
    detect the specific object in the another image,
    acquire an input for designating an area in the another image to correspond to the registered image,
    generate the positional information based on a position of the specific object in the another image and a position of the area, and
    store, into a memory, the registered image and the positional information associated with the specific object.

13. The display control device according to claim 12, wherein the circuitry is configured to generate the positional information, which defines the position for the registered image, based on an offset with respect to the position of the area in the another image.

14. The display control device according to claim 13, wherein the registered image is disposed adjacent to a face of the authentication target in the image.

15. The display control device according to claim 11, wherein the specific object is a marker.

16. The display control device according to claim 15, wherein the marker is printed on an identification card supported by the authentication target.

17. A method of controlling a display device, the method comprising:

detecting a specific object that is supported by an authentication target in an image;

obtaining content data associated with the specific object, the content data including a registered image of a registered user and positional information between the specific object and the registered image; and controlling, by circuitry, a display to superimpose the registered image on the image at a position based on the positional information and to superimpose pointer information on the image in order to provide a comparison between the authentication target and the registered user, wherein the pointer information includes at least one of a line that extends horizontally from a top portion of a face of the registered user, or another line that extends horizontally from a bottom portion of the face of the registered user.

18. A non-transitory computer readable medium storing a computer program, the computer program configured to perform the method according to claim 17 when executed on a computer.

* * * * *